Nov. 28, 1950  J. G. READING  2,531,947
BOAT TRAILER
Filed March 11, 1949  3 Sheets-Sheet 1
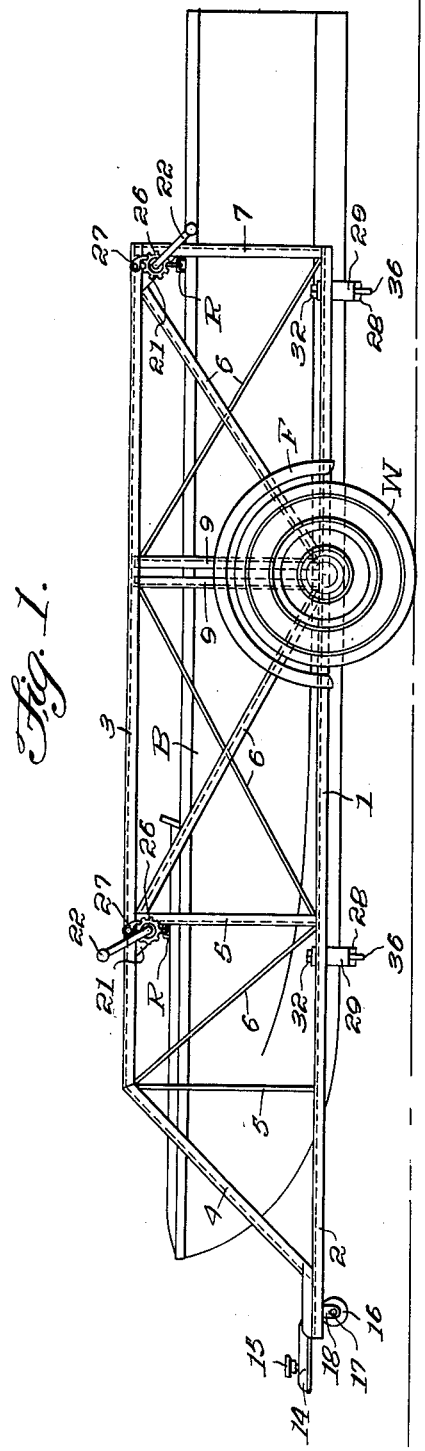
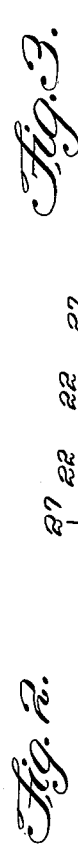
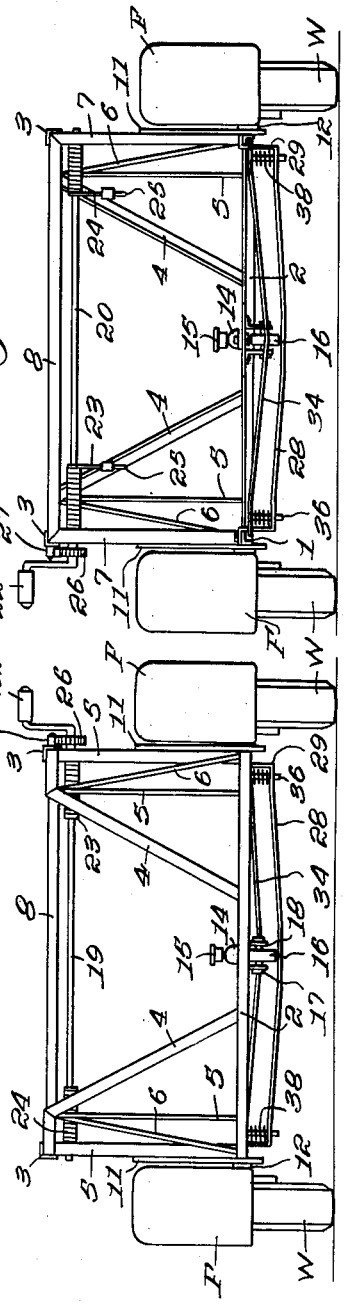
INVENTOR.
John A. Reading,
BY Victor J. Evans & Co.
ATTORNEYS

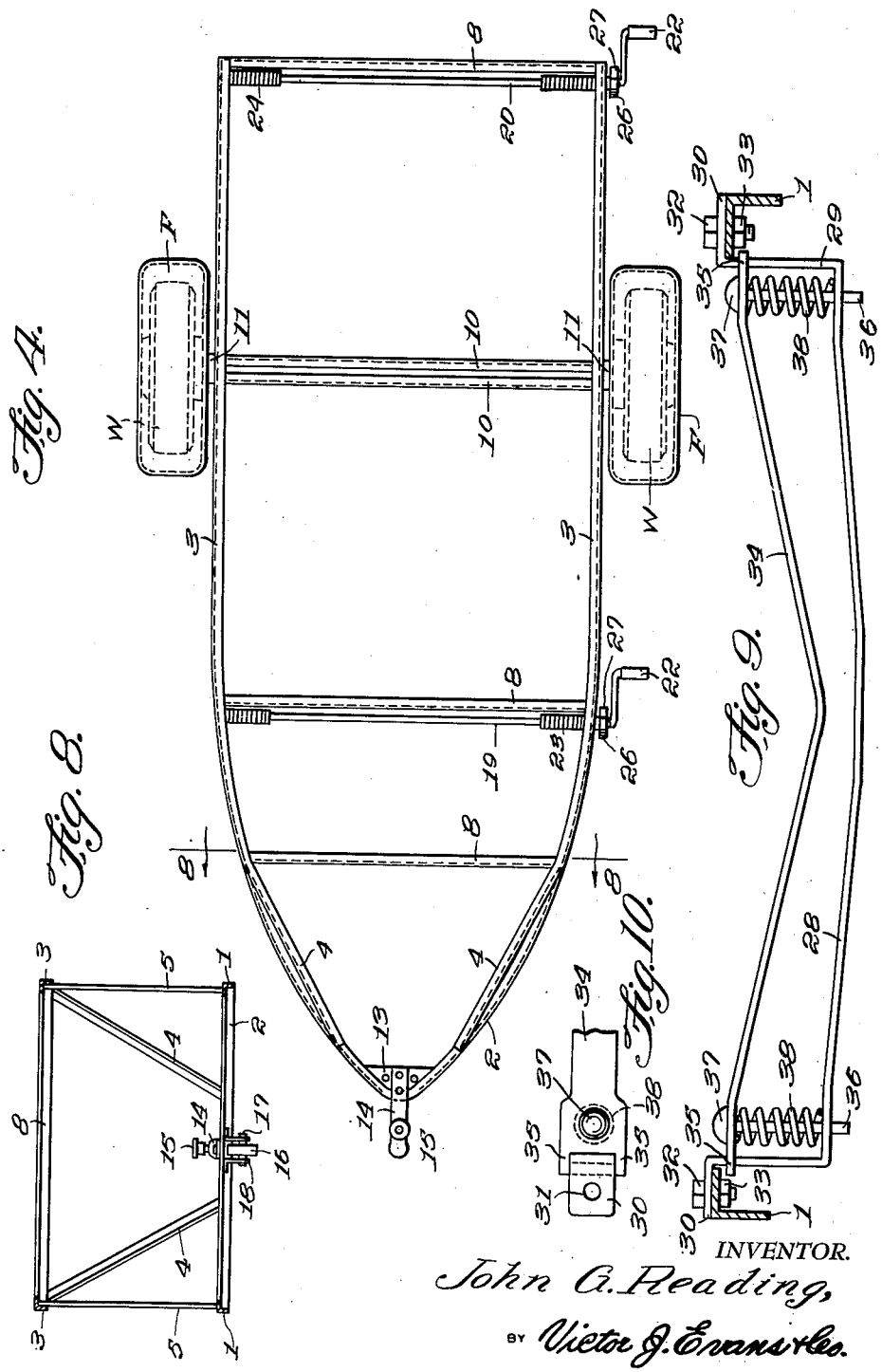

Nov. 28, 1950　　J. G. READING　　2,531,947
BOAT TRAILER
Filed March 11, 1949　　3 Sheets-Sheet 3
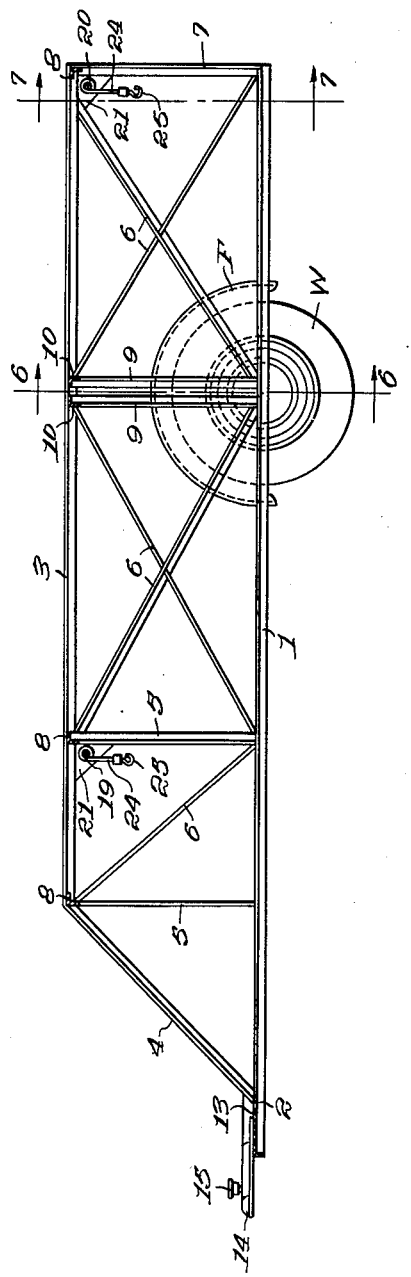
INVENTOR.
John G. Reading,
BY Victor J. Evans & Co.
ATTORNEYS Patented Nov. 28, 1950

2,531,947

UNITED STATES PATENT OFFICE 2,531,947

BOAT TRAILER

John G. Reading, Black Mountain, N. C.

Application March 11, 1949, Serial No. 80,947

1 Claim. (Cl. 214—75)

The present invention relates to improvements in boat trailers of the two wheel type and adapted to be towed by an automotive vehicle on overland highways in transporting a boat, or other heavy and cumbersome objects, and for use in lowering the boat into the water as well as for hoisting the boat out of the water with comparative ease and safety.

The primary purpose of the invention is the provision of a trailer that is of light weight material but trussed and braced to insure a durable vehicle for an under-slung boat wherein a low center of gravity is obtained, and the strains imposed from the towing automobile or other similar vehicle are absorbed in the frame of the trailer to insure smooth traveling over a highway.

The trailer includes a minimum number of parts that may with facility be manufactured at low cost of production and the parts may be assembled with convenience and a minimum expenditure of time and labor; and the trailer is equipped with manually operated hoisting mechanism that is simple in construction and operation.

The invention consists in certain novel features of construction and combinations and arrangements of parts as will hereinafter be described and more particularly pointed out in the appended claim.

In the accompanying drawings I have illustrated a complete example of a physical embodiment of, my invention in which the parts are combined and arranged in accord with one mode I have devised for the practical application of the principles of my invention.

It will however be understood that changes and alterations are contemplated and may be made in these exemplifying drawings and mechanical structures, within the scope of my claims without departing from the principles of the invention.

Figure 1 is a view in side elevation of the trailer with the under-slung boat suspended therein.

Figure 2 is a front end elevation; and Figure 3 is a rear end elevation of the trailer.

Figure 4 is a plan view of the trailer; and Figure 5 is a longitudinal vertical sectional view thereof.

Figure 6 is a transverse vertical sectional view at line 6—6 of Fig. 5; and Figure 7 is a similar view at line 7—7 of Fig. 5.

Figure 8 is a vertical transverse sectional view at the front of the trailer. Figure 9 is an enlarged view of one of the spring suspension saddles; and Figure 10 is a detail plan view at one end of the saddle.

In order that the general arrangement and utility of parts may readily be understood I have indicated in Fig. 1 a boat B which is provided with four ring bolts R mounted in the gunwales of the boat, and arranged in pairs fore and aft to uniformly distribute the weight of the boat as it is suspended in under-slung position within the open work frame of the trailer.

The base of the trailer, in the form of a horizontally disposed U-shaped draft beam, is made of two laterally spaced angle iron or steel side rails 1, 1, that are united at their front ends by a bow 2; and the rails 1, 1 support trussed side frames that include the two top rails 3, 3, which terminate in downwardly declining braces 4, 4, fastened at opposite sides of the longitudinal center line of the trailer to the bowed end 2.

The trussed side frames have upright posts 5 and diagonal braces 6 uniting the base with the upper rails, and two rear corner posts 7, 7; and the top rails are united by cross braces as 8 to form an open-work enclosure conforming to the outline of the boat and adapted to receive and support the boat. The joints of the metallic frame work may be welded, bolted together, or otherwise fastened to insure a strong and durable structure capable of suspending and supporting the boat, and forming a substantial carrier for the boat.

A pair of outside wheels W with their fenders F are located in desired position for supporting the trailer frame, and the frame is provided with a transversely arranged and angular arch or axle support made up of double upright posts 9 and cross bars 10, with bearing side plates 11 between the frame and the wheels. The bearing plates are each equipped with a laterally projecting stud axle 12 upon which the wheels are journaled, and the wheels at the approximate center of gravity of the trailer equalize and support the loaded trailer.

For coupling a towing vehicle to the trailer, the bowed front end of the U-shaped draft beam is provided with a reinforcing hitch plate 13 upon which is mounted a central draft bar or draw bar 14, and a coupler 15 of suitable type is utilized in hitching the trailer at the rear end of a towing vehicle, for transportation purposes.

To support the front end of the trailer when it is detached from the towing vehicle, an auxiliary castor wheel 16 is journaled at 17 in a bracket 18 mounted at the apex of the bow 2, and the castor wheel of small size facilitates in pushing or pulling the trailer to desired positions.

For hoisting the boat out of the water, suspending the boat within the trailer for transportation purposes, and for lowering the boat to desired positions, a front windlass or winch 19 and a rear windlass 20, arranged transversely of the trailer, are journaled in bearings of pairs of corner plates 21 mounted in the side frames.

The windlasses are provided with squared or angular ends adapted to receive detachable and interchangeable crank handles 22 that are manually operated to turn the hoisting mechanism, and each windlass is provided with a pair of suspension cables, as 23 and 24 having snap hooks 25 at their free ends for engagement with the ring bolts R of the boat.

The windlasses are equipped with usual ratchet wheels 26 and pawls 27 for controlling the winding and unwinding operations of the cables on the windlass rotors or shafts, and these parts are manually controlled as usual.

For loading the boat on the trailer, the trailer is alined with the boat and then backed, over the bow end first, in position over the boat, and for a one-man operation the crank handle is attached, the front cables are hooked to the ring bolts, and the bow portion of the boat is hoisted into desired position. Then the interchangeable handle is detached and employed in lifting the stern end of the boat into position, with the bow located in the bowed front of the trailer between the declining and inwardly projecting bars or arms 4 and posts 5, and as indicated in Fig. 1, only short lengths of the cables depend from the windlasses to stabilize the suspension of the boat. In traveling, the strains of towing are applied to the bowed base 1—2, beneath the load, and the movements of the trailer are easily controlled by the towing vehicle for safety in driving along a highway.

As an auxiliary brace for the rails 1, 1, of the side frames, and to absorb jolts and strains that would otherwise be imposed on the boat while traveling in the trailer and over a highway, I preferably employ a pair of removable and interchangeable spring suspension saddles for resiliently supporting the boat in the trailer.

These detachable cross saddles are mounted upon the side walls 1, 1, beneath the hull of the boat after the boat has been hoisted into uppermost position and suspended by the cables; and after the saddles have been fixed in place the cables may be slackened slightly to rest the boat upon the resilient and depressible saddles. Preparatory to unloading the boat from the trailer the two saddles may readily be detached from the trailer to permit unobstructed lowering of the boat when desired.

As best seen in Figs. 1, 9, and 10, the saddles, which are attached in front of and to the rear of the wheels, each consists of a flat metallic base strip 28 having upright end posts 29 that terminate in horizontal attaching flanges 30 having bolt holes 31 that are adapted to register with bolt holes in the side rails 1, 1. The flanges 30 rest upon the rails 1, 1, and the base strip is rigidly attached to the rails by means of bolts 32 and nuts 33. Each base strip is equipped with a resiliently supported and depressible metal strip 34 having bifurcated or forked ends 35 projecting beyond the posts 29 of the base strip, and these forked ends coact with the posts to retain and guide the depressible strip.

For resiliently supporting the depressible strip 34 the notched ends 35 of the strip 34 are each equipped with a bolt 36 that passes through a hole in strip 34 and a registering hole in strip 28, and the head 37 of the bolt is welded or otherwise fixed to the depressible strip so that the bolts may move with the depressible and resiliently supported strip of the saddle.

Between the two strips, at each end of the saddle, a spring 38 is coiled about bolt 36, and the springs tend to elevate the upper strip and hold it in close contact at all times with the hull of the boat. These removable and interchangeable resilient saddles may readily be attached and detached when desired by manipulating the bolts 32 and nuts 33.

Having thus fully described my invention, what I claim as new and desire to secure by Letters Patent is:

In a two wheel trailer having hoisting and suspending means, the combination with a U-shaped draft beam having a front coupler, and a suspending frame erected on the draft beam, of a pair of interchangeable and removable boat-supporting saddles, each said saddle including a metallic base strip rigid with the beam, a depressible boat-supporting strip mounted on the base strip, coacting means on the strips for retaining and guiding the movements of the supporting strip, and spring-members interposed between said strips.

JOHN G. READING.

REFERENCES CITED

The following references are of record in the file of this patent:

UNITED STATES PATENTS

| Number | Name | Date |
|---|---|---|
| 2,389,338 | Zorc, Jr. | Nov. 20, 1945 |
| 2,442,994 | Clary | June 8, 1948 |
| 2,457,395 | Owens | Dec. 28, 1948 |
| 2,478,424 | Reid | Aug. 9, 1949 |
| 2,485,793 | Vassar | Oct. 25, 1949 |
| 2,494,509 | Gruska | Jan. 10, 1950 |

FOREIGN PATENTS

| Number | Country | Date |
|---|---|---|
| 470,114 | Great Britain | Aug. 10, 1937 |